Aug. 18, 1925.  1,550,365
F. JONES
MATERIAL HANDLING MACHINE
Filed Jan. 20. 1923   2 Sheets-Sheet 2
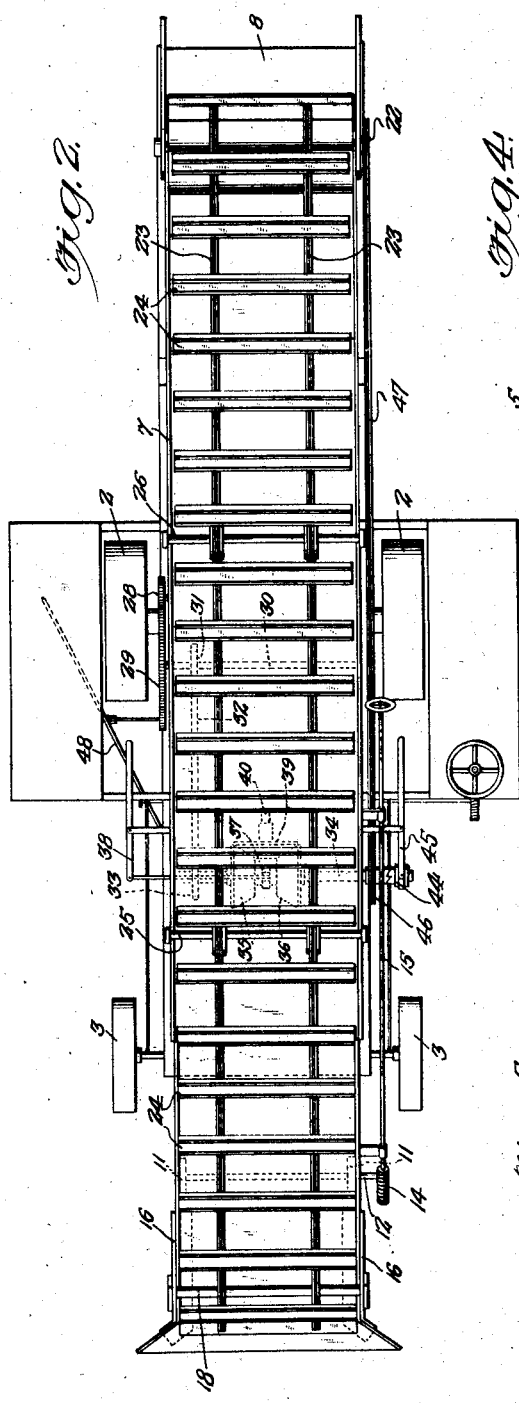
Inventor
*Frank Jones,*
By *Fowler & Smith,*
Attorneys Patented Aug. 18, 1925.

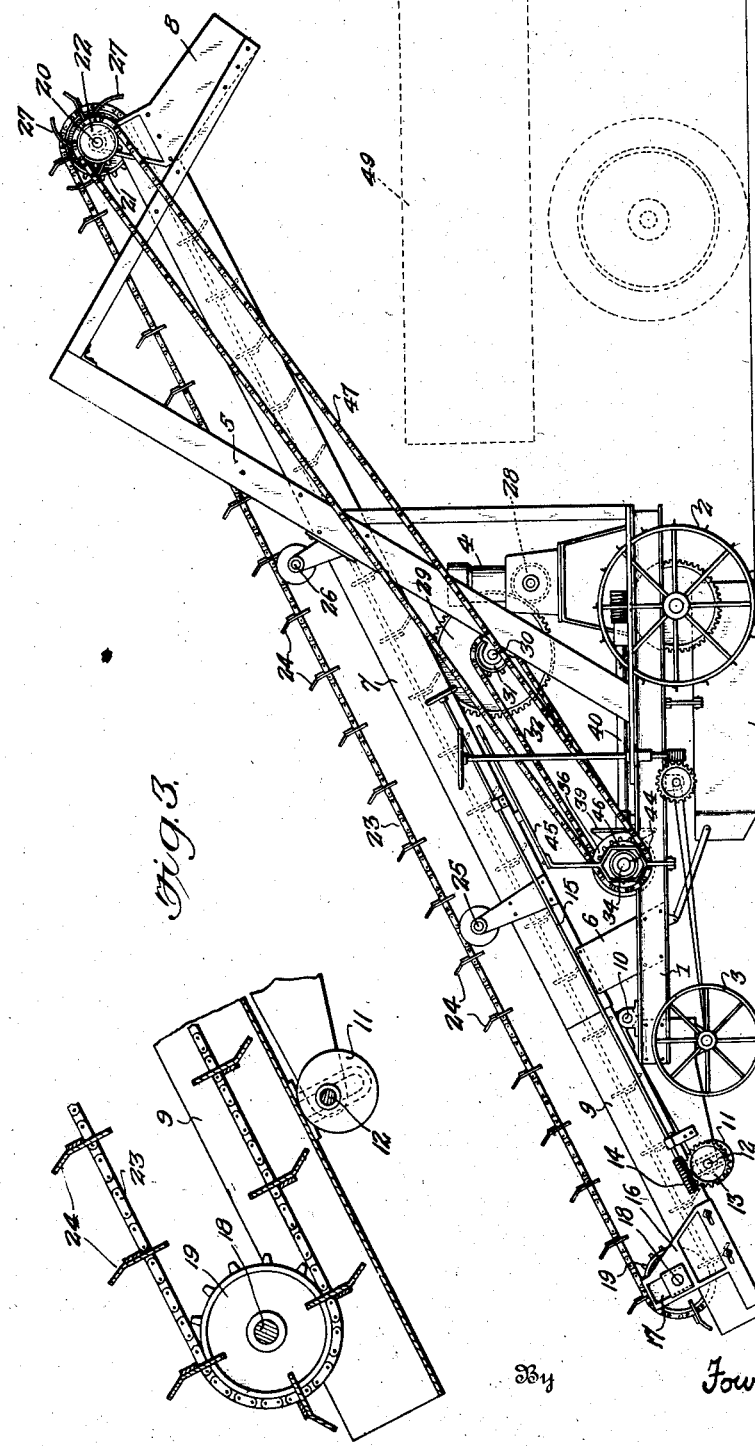

1,550,365

UNITED STATES PATENT OFFICE.

FRANK JONES, OF SALT LAKE CITY, UTAH.

MATERIAL-HANDLING MACHINE.

Application filed January 20, 1923. Serial No. 613,928.

*To all whom it may concern:*

Be it known that I, FRANK JONES, a citizen of the United States, residing at Salt Lake City, in the county of Salt Lake and State of Utah, have invented certain new and useful Improvements in Material-Handling Machines, of which the following is a specification.

My invention relates to certain new and useful improvements in material handling machines, and has particular reference to a machine designed for the special purpose of removing snow from streets or highways and loading the same into a suitable container, such as a truck, wagon, or the like.

An object of my invention is to provide a material handling machine of the tracto or self-propelled type in which the traction engine or motor is utilized to drive an endless drag conveyor operating in a suitable inclined pan, for removing snow or other material from a surface and conveying the same upwardly and rearwardly to a suitable point of discharge above a container or conveyance in rear of the machine.

A further object of my invention is to provide a material handling machine of the inclined pan and endless drag conveyor type in which the lower end of the inclined pan is vertically adjustable to accommodate the surface-engaging end of the pan to irregularities in the surface being worked, and in which the lower end of the endless drag conveyor is supported in vertically movable bearings to permit the conveyor drags to rise from the pan in the event that a foreign substance is encountered by the conveyor drags and pan.

A further object of my invention is to provide a device of the above mentioned character having a novel means at the upper discharge end of the conveyor for forcing or ejecting the material from the space between the drags on the conveyor chain and discharging the same into an underlying chute, from whence it drops into the truck or wagon below.

A still further object of my invention is to provide a device of the above mentioned character which is simple in construction, strong and durable, convenient in use, and highly efficient in the purpose for which designed.

In the accompanying drawings forming a part of this specification and in which like numerals are employed to designate like parts throughout the several views:

Figure 1 is a side elevation of a material handling machine embodying my invention, Figure 2 is a top plan view of the same, Figure 3 is a horizontal sectional view of the ground-engaging end of the conveying pan and drag conveyor, Figure 4 is an end view of the upper discharge end of the drag conveyor, showing the means for forcing the material from between the drags, and Figure 5 is a sectional view taken on the line 5—5 of Figure 4.

Referring to the drawings wherein for the purpose of illustration is shown a preferred embodiment of my invention, the numeral 1 designates a rectangular chassis frame, mounted at its rear upon suitable traction wheels 2 and at its forward end upon manually-controlled steering wheels, 3. Supported upon the frame 1, preferably at a point above the rear wheels 2, is a suitable motor 4 for propelling the machine and also for operating the loading mechanism in a manner to be hereinafter described.

Supported above the chassis frame 1 by rear braces 5 and forward braces 6 is a long inclined pan section 7, having upturned sides, and terminating at its upper end in the downwardly extending chute 8. Arranged at the lower end of the inclined pan 7 and forming a continuation thereof, is a second pan section 9, pivotally mounted on a transverse shaft 10, journaled near the forward end of the frame 1. This inclined pan section 9 is supported intermediate its ends, upon the cams 11, keyed to a transverse shaft 12, to one end of which is secured the gear wheel 13. Coacting with the gear wheel 13 is a worm gear 14, rotated by a shaft 15 which is under the control of the operator of the machine. It is thus obvious that rotation of the cams 11 will cause the lower end of the pan section 9 to be raised or lowered from the ground at the will of the operator to meet varying conditions in the surface being cleared.

At each side of the lower end of the pan section 9 is secured a side bracket 16, at the upper portion of which is a rectangular opening 17, said brackets forming the journals for the end bearings of a transverse shaft 18.

Mounted on this shaft 18, near the ends thereof, are spaced sprockets 19 and the end bearings of this shaft are vertically slidable within the rectangular opening 17 for a purpose to be hereinafter described. At the upper end of the pan section 7 is a second transverse shaft 20 journaled in suitable side brackets formed by the sides of the chute 8. Mounted on this shaft 20, near the ends thereof, are a pair of spaced sprockets 21 and at one end of said shaft is a third sprocket 22 by means of which the shaft 20 is caused to rotate. Connecting the sprockets 19 and 21 are a pair of endless sprocket chains 23, carrying at spaced intervals throughout their length a plurality of transverse drags 24, adapted to move in close proximity to the bottom of the pan sections 7 and 9. Intermediate the shafts 18 and 20 are arranged the idler shafts 25 and 26, carrying idler pulleys which support the upper lengths of the endless chains 23.

Keyed to the transverse shaft 20, between the spaced sprockets 21 and at the outer sides of said sprockets is a sectional ejector or discharge member, comprising a series of plates 27, radiating from the shaft and curved in a direction opposite to the direction of rotation of said shaft, which, upon rotation of the shaft 20 and the consequent movement of the conveyor chains 23, mesh with the drags 24 on said conveyor chains and force the material from the space between the drags in a manner clearly indicated in Figures 4 and 5. The curvature of the plates 27 in a direction opposite to the direction of rotation of the shaft 20 is of decided advantage in the operation of the ejector mechanism, in that such curved plates present a relatively wide surface between the drags of the conveyor to force the material downwardly and outwardly from between the drags.

Power necessary to propel the machine and to operate the several mechanisms referred to above, is derived from an engine or motor 4, having a gear 28 designed to drive a gear 29 on the transverse shaft 30, which has a sprocket wheel 31 mounted thereon. This sprocket 31 drives the chain 32, sprocket wheel 33 and shaft 34, said shaft carrying the friction wheels 35 and 36 which revolve with the shaft. A yoke 37, attached to the friction wheels 35 and 36, is actuated by lever 38, whereby when this lever is moved to one side, the friction wheel 36, is in contact with a friction wheel 39, thus driving the latter in one direction. By moving the lever 38 to the opposite side, the friction wheel 36 is removed from driving engagement with the friction wheel 39 and the friction wheel 35 is brought into operative engagement with the friction wheel 39, causing the same to rotate in the opposite direction. The friction wheel 39 is on a shaft 40, to which is attached a worm 41 which drives a worm wheel 42 on the rear drive axle 43 which drives the traction wheels 2.

Slidably mounted at one end of the shaft 34, is a clutch member 44, which revolves therewith and is actuated by a lever 45, which, when moved to one side, connects the clutch with a pinion 46, loosely mounted on the shaft 34, which transmits motion to the pinion 22 by means of the connecting sprocket chain 47, as will be readily understood from the drawings. The ratio of the various driving gears and sprockets referred to above, is such that the conveyor drags travel from three to four times as fast as the entire machine moves forward. At the right hand side of the machine a guard 48 is used, attached to the main frame just in advance of the right rear wheel, for clearing the track of the material being worked.

Referring to the operation of the device as used for the purpose of removing snow from the streets and highways, the machine is driven to the point where the pile or bank of snow is located and the lower end of the pan section 9 pushed into the same. The operator then connects the clutch 44 to the sprocket 46 by means of the handle 45, thus causing a counter-clockwise movement of the conveyor chain 23, which enables the drags 24 to bite into the snow bank and convey a portion of the snow upwardly and rearwardly to the upper end of the machine. As the chains and drags move about the sprockets 21, the radially arranged arms 27 of the ejector mechanism mesh with the space between the drags 24 and force the snow from between the same, discharging the same into the chute 8, from whence it drops into a truck or wagon 49, in the rear of the machine. If, during this loading operation the moving drags should strike a foreign substance, such as a stone, piece of wood or the like, the diameter of which is greater than the distance between the drags and pan, the shaft 18 will move upwardly within the rectangular opening 17, and allow the substance to be carried through and discharged into the conveyance 49. In the event that a large frozen bank of snow is encountered the machine, by means of the friction clutch controlled by yoke 37 and handle 38, will be moved forward only an inch or more while the conveyor chains and drags will travel at a constant speed. While the machine can be used to advantage in removing the snow directly from the highway surface, it has been found advantageous to employ separate scrapers for removing the snow from next to the curbing to a point ten or fifteen feet nearer the center of the highway, and for making a like path from the center. The machine then moves its way down this line of piled snow, conveying the same upwardly and rearwardly and depositing the same into the waiting trucks or wagons, which haul the snow to vacant areas, where its presence is not objectionable. Or, instead of employing this method, the position of the chute 8 at the top of the machine, may be changed from rearward to sideward and the machine driven down the highway, thus removing the snow from the surface, conveying the same upward and sidewards, and piling the same to a height of five or six feet at the side of the road. Returning along the other side of the highway would in like manner, result in clearing a space sufficiently wide for traffic, the exact width of the space depending, of course, upon the width of the machine built.

While I have elected to describe the operation of my device as used in connection with the operation of loading snow into trucks or wagons, it should be understood that this use is by way of illustration only and that the same may be employed with equal facility for loading sand, gravel, or any other granular material into a suitable container or conveyance. It should be further understood that the form of my invention shown and described herein is to be taken as a preferred example of the same, and that various changes in construction size and arrangement of parts may be resorted to without departing from the spirit of the invention or scope of the subjoined claims.

Having thus described my invention what I claim as new and desire to secure by Letters Patent is:

1. In a material handling machine, the combination of an inclined pan, an endless drag conveyor supported in an inclined position above said pan, driving means for causing the conveyor drags to traverse the pan to raise the material from the bottom to the top of said pan, a transverse shaft arranged beneath the lower end of said pan, cams on said shaft on which the pan rests, and means for causing rotation of said shaft and cams to vary the vertical position of the lower end of said pan.

2. In a material handling machine, the combination of an upper inclined pan section, a second inclined pan section forming a lower continuation of said first section, a transverse shaft forming a pivot for the upper end of said lower pan section, a second transverse shaft intermediate the ends of said lower pan section, cams on said shaft on which the lower pan section rests, means for causing the rotation of said shaft and cams to vary the vertical position of said lower pan section, an endless drag conveyor supported in an inclined position above said pan sections, and driving means for causing the drags to traverse the pan sections to raise the material from the bottom to the top of the machine.

3. In a material handling machine, the combination of an inclined pan, a transverse shaft carrying sprockets and journaled near the lower end of said pan, a second transverse shaft carrying sprockets and journaled near the top of said pan, an endless drag conveyor passing over said sprockets and driven thereby, and a series of plates radiating from said upper shaft and curved in a direction opposite to the direction of rotation of said shaft and driven thereby, said curved plates meshing with the drags and presenting a surface for forcing the material from the space between the drags.

4. In a material handling machine, the combination of an inclined pan, a transverse shaft carrying spaced sprockets journaled near the lower end of said pan, a second transverse shaft carrying spaced sprockets and journaled near the top of said pan, an endless drag conveyor passing over said sprockets and driven thereby, a series of curved plates mounted on and driven by said upper shaft and arranged between the spaced sprockets, and a series of curved plates mounted on said shaft and driven thereby and arranged near the ends of said shaft beyond the sprockets, said curved plates meshing with the drags for forcing the material from the space between the drags.

FRANK JONES.